May 12, 1931.  V. C. WORLEIN  1,805,350
VEHICLE SPRING SNUBBER
Filed July 19, 1930
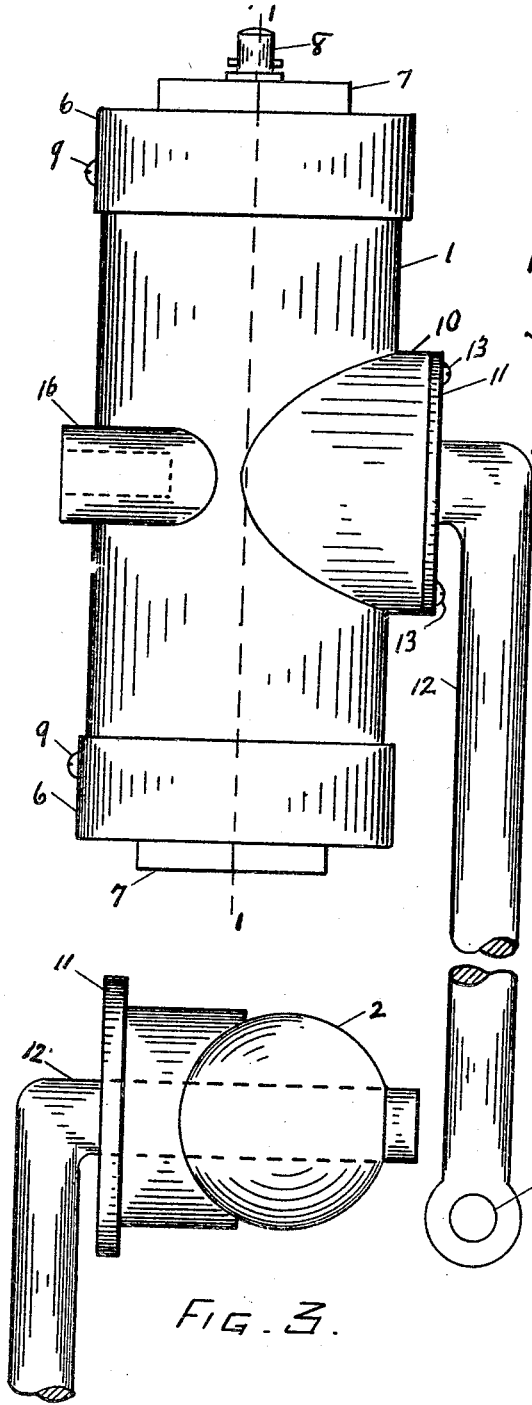
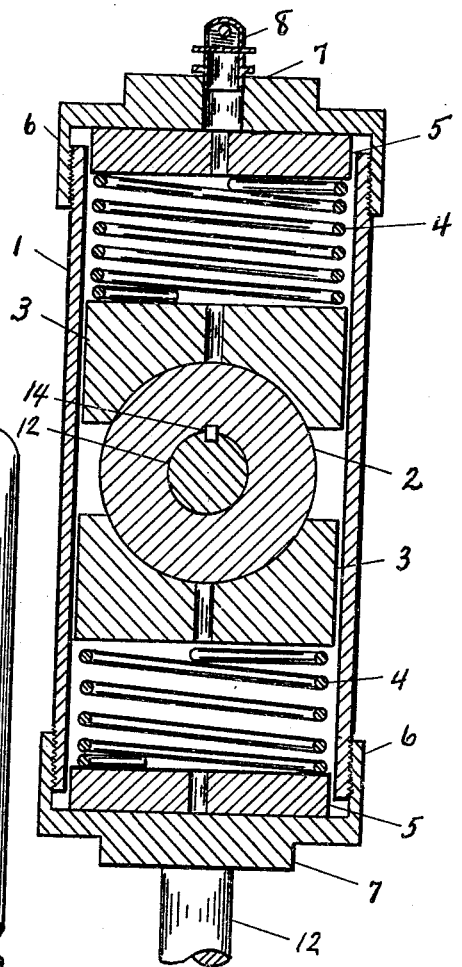

Patented May 12, 1931

1,805,350

UNITED STATES PATENT OFFICE

VALENTIN C. WORLEIN, OF CHICAGO, ILLINOIS

VEHICLE SPRING SNUBBER

Application filed July 19, 1930. Serial No. 469,138.

The object of the present invention is to provide a snubber especially adapted for use on automobiles, which will reduce the shock of the compression and recoil of the springs when riding over rough roads, and provide smooth even comfort for the passengers.

Another object is to provide a device readily attachable between the body portion and the axle, across the spring suspension, by means of which all undue compression and recoil of the springs may be absorbed in said device, to provide even, and gradual compression and recoil thereof.

Another object is to provide a snubber which shall consists of few parts, be simple in construction and operation, be readily and quickly adjustable for various loads and tensions and be low in cost.

Another object is to provide a snubber in which the controlling means is friction produced by spring compression upon a suitable ball, operable from any position, and nonlocking.

With the above and other objects in view, which will more particularly appear from the drawings and specification following, I have shown one embodiment of my invention in the accompanying drawings, in which like numerals of reference refer to the same part throughout the various views, and in which, Figure 1 is an elevation of said snubber ready for attachment to an automobile.

Figure 2 is a section view of said snubber, taken along the line 1—1 in Figure 1.

Figure 3 is a detail view of the crank, ball and cover plate.

It is the usual experience of those riding in automobiles, that springs adjusted to absorb the shocks caused by the slight inequalities of paved roads, permit too much contraction and recoil on rough roads, causing much discomfort for the passengers. By connecting the snubber described herein across the spring suspension between the body of the automobile and the axle, or equivalent part, the contraction and recoil of the springs, when passing over rough roads, may be reduced to any desired action to provide smooth and easy riding comfort for passengers. The present invention shortens the contraction and subsequent recoil, and lengthens the space of time covered by said contraction and recoil, and thus smooths out the jolt ordinarily felt to a comfortable movement.

In the accompanying drawings I have shown one embodiment of my invention as adapted for use on automobiles. The snubber shown consists of a hollow housing 1 of the general shape of a pipe-T. The longer ends are bored to receive the ball 2, ball-cups 3, 3, compression springs 4, 4, compression members 5, 5, and are preferably threaded at the ends on the outer side to receive the interiorly threaded caps 6, 6, screwed upon the ends. These caps 6, 6 are preferably provided with hexagon or square bosses at their outer ends 7, 7 convenient for operation by a wrench, and oil cups 8, 8 and may also be provided with set screws 9, 9 to lock the caps in position against accidental movement in use.

The short member 10 of the housing 1 is bored to permit insertion of the ball 2 therethrough, and is provided with a cover plate 11 attached to said housing by means of suitable screws 13, 13. A central opening is provided in the cover plate for the crank 12 which forms a bearing for said crank, and the interior end of said cover plate is made in the shape of a ball-cup to fit the ball 2, as shown.

The crank 12 is provided with an opening at 15 convenient for swivel attachment by means of suitable bolt to the axle or other part of the automobile desired. At the inner end, the crank passes through the opening in the cover plate, and a suitable opening in the ball 2, and is securely attached thereto by means of a key 14, or other suitable provision. Bosses 16, 16 are provided at one side of the housing, with suitable threaded openings to receive bolts for attachment to the frame, or other desired portion of the automobile.

In the construction of my snubber, I have preferably made the housing of a suitable casting, bored to receive the parts above described, and threaded at its outer ends to receive the caps 6, 6. The ball 2 may be made of steel, or other suitable material, turned to the shape of a perfect globe, with a suitable opening to receive and attach the crank 12 as shown. The friction ball-cups 3, 3 are preferably made of highly compressed fibre, or other equally suitable material. The springs 4, 4 should be of any tension required for the use required from the particular snubber in use, and the compression members 5, 5 may be of steel or other suitable material. The snubber is easily and quickly assembled by attaching the crank 12 to the ball, and inserting the ball within the housing, and attaching the cover plate thereto. The friction ball-cups 3, 3, the springs 4, 4 and the compression members 5, 5 are inserted in their respective ends, and the caps 6, 6 are screwed thereon until the desired friction is applied to the ball. It will be apparent that the friction upon the ball may be increased or decreased to any desired point by merely rotating the caps 6, 6 forward or backward, to increase or decrease the pressure of the springs 4, 4 against said ball-cup members, and said ball.

With the snubber described above suitably attached across the spring suspension of the automobile, the crank arm 12 will rotate the ball 2 against the friction of the ball-cups whenever the spring is compressed. This applied friction, will slow up the time within which the spring is compressed, and will also act similarly on the recoil, to slow up the recoil of the spring, producing a smooth, even lowering and raising of the body of the automobile.

By providing lighter or heavier springs, the snubber may be adjusted to every size and weight of car and load. The tension may always be increased or decreased, in case it is not suitably adjusted, by turning the caps forward or backward to secure the tension desired. Means for lubrication has been provided, and there can be very little wear, if any, and there is no danger of the snubber locking in any position as with some in use.

While I have shown the snubber as adapted and applied to use on automobiles, it will be apparent that by changing the shape of the housing it may be adapted for any use where a similar service is required.

It will be apparent that the snubber will operate equally well, adjusted to operate at any portion or all of a circle, as the friction remains the same at every portion of the revolution of the ball and the crank.

If it is desired to adjust the snubber to operate during only a portion of the contraction and recoil of the spring, it may be attached by means of a suitable link connection between the axle and the outer end of the crank to operate during the arc of the circle desired.

Having thus described my invention, what I claim, and desire to secure by Letters Patent, is the following:—

1. In combination with a housing, a crank rotatably mounted therein, a ball mounted upon the end of said crank disposed within the housing, friction members in contact with said ball, compression means, and springs between said friction members and said compression means.

2. In combination with a crank having a ball mounted upon one end thereof, means for rotatably mounting said crank, and means for applying friction to said ball.

3. In a snubber for vehicles, the combination of a housing, having means for attachment to one portion of the vehicle, a socket within said housing, a ball seated within said socket, a crank mounted in a bearing in said housing, and attached to said ball, spring actuated friction members in contact with said ball, means for varying the friction of said members against the ball, and means at the outer end of the crank for attachment to a second portion of the vehicle, substantially as shown and described.

4. In a snubber for vehicles, the combination of a housing having means for attachment to the body of said vehicle, a socket within said housing, a ball seated within said socket and in turn mounted upon one end of a crank, a crank pivotally mounted in the housing, friction means within the housing in contact with said ball, compression springs in contact with said friction means, compression means attached to said housing for increasing the pressure of the friction members, and means for attaching the outer end of the crank to the axle.

5. A device for absorbing the shock caused by rapid excessive movement of two elements separated by a spring, comprising a housing attached to one element, a crank pivotally attached to the second element, a ball upon the unattached end of said crank, said ball being seated in a socket in said housing, means for applying friction to said ball, and means for varying the pressure of said friction so applied to said ball.

In testimony whereof, I have hereunto affixed my signature.

VALENTIN C. WORLEIN.